United States Patent Office 2,785,173
Patented Mar. 12, 1957

2,785,173

DIALKYLAMINOALKYLPHENETIDINOPYRIDINE QUATERNARY AMMONIUM SALTS

Robert R. Burtner, Skokie, Ill., assignor, by mesne assignments, to G. D. Searle & Co., Skokie, Ill., a corporation of Delaware No Drawing. Application March 17, 1953,
Serial No. 342,965

10 Claims. (Cl. 260—296)

This invention relates to quaternary ammonium salts of dialkylaminoalkylphenetidinopyridines, and to processes for the preparation thereof. In particular, it relates to pyridine derivatives of the formula

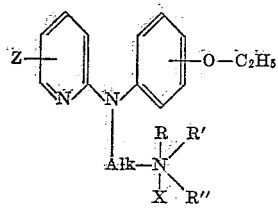

wherein Alk is a lower alkylene radical containing at least 2 and not more than 4 carbon atoms; Z is hydrogen or a methyl radical; R is a lower alkyl radical, that is, a radical containing not more than 4 carbon atoms; NR'R" is either a lower dialkylamino radical or a nitrogen-containing heteromonocyclic radical; and X is one equivalent of an anion.

In the compounds of the foregoing formula, Alk represents alkylene radicals such as ethylene, propylene, butylene, trimethylene, tetramethylene, and like bivalent radicals derived from saturated aliphatic hydrocarbons containing 2 to 4 carbon atoms. The radical R represents such lower alkyl radicals as methyl, ethyl, propyl, isopropyl, butyl, isobutyl, and secondary butyl. The radicals R' and R" represent lower alkyl radicals of the foregoing type or, taken together with the attached nitrogen, they represent saturated nitrogen-containing heterocyclic radicals such as piperidino, morpholino and pyrrolidino radicals. The substituent X represents one equivalent of an anion, as remarked, and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention are useful in medicine as antichloinergic agents. Specifically, they manifest the property of blocking or inhibiting the transmission of nerve impulses across autonomic ganglia, parasympathetic neuroeffector junctions, and the myoneural junctions in skeletal muscle. Moreover, the compounds of this invention show appreciable chemotherapeutic promise in the field of cardiac pathology. In particular, they are valuable because of their digitalis-like activity, showing marked capacity for myocardial stimulation in instances of insufficiency associated with the failing heart.

The subject compounds are soluble in water, as also in aqueous solutions of alcohols and other water-miscible organic solvents. They may be administered in solid form as tablets or capsules; dissolved in aqueous media, they may be given parenterally.

The compounds to which this invention relates are conveniently prepared according to the following procedure: An α-halogenated pyridine or picoline, for example 2-bromo-4-methylpyridine, is reacted with a phenetidine, for example p-phenetidine, in the presence of a condensing agent such as potassium carbonate or, preferably, copper powder, to form an α-phenetidino pyridine or picoline. The condensation is ordinarily carried out at elevated temperatures (120° to 175° centigrade) and reduced pressures (25 to 60 millimeters of mercury) over periods of time ranging upward from one hour. One suitable combination of temperature, pressure, and time is 140–150° centigrade at 40 millimeters pressure for 6 hours. The phenetidinopyridine is, in turn reacted successively with a condensing agent such as sodamide, and a dialkylaminoalkyl halide, for example diethylaminoethyl chloride, to produce the corresponding N-dialkylaminoalkylphenetidino compound. Various inert, non-polar, organic liquids will serve as reaction media, toluene having been found a solvent of choice when sodamide is the condensing agent. With potassium carbonate, butanone may be used. The reaction is commonly run at temperatures of -90° to 110° centigrade and completed after approximately 20 hours. Temperatures of the order of 20° higher or lower may also be used, and the reaction time may vary from 10 to as long as 36 hours. A nitrogen atmosphere is ordinarily maintained throughout the course of the reaction, though this may be dispensed with after the first 2 or 3 hours. The N-dialkylaminoalkylphenetidinopyridine thus formed, the formula of which is

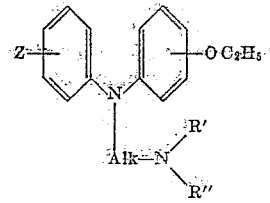

where Z, Alk, R', and R" have the meanings hereinbefore defined, is then quaternized by addition of an alkyl ester of the formula

R—X (R and X having the meanings hereinabove assigned), using temperatures in the range of 0° to 50° centigrade and an inert solvent such as chloroform, acetone, butanone, methanol, butanol, and the like. The reaction is ordinarily completed in from 12 to 48 hours, and is generally carried out in a closed system if a lower alkyl halide such as methyl chloride is one of the reagents. Using methyl chloride, the reaction may be smoothly effected in chloroform solution at 25° centigrade for 24 hours.

The following examples will illustrate in detail certain of the pyridine derivatives which constitute the present invention, and methods which have been devised for their preparation. However, the invention is not to be construed as limited thereby either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *4-methyl-2-(p-phenetidino)pyridine.*—A mixture of 237 parts of 2-bromo-4-methylpyridine, 192 parts of p-phenetidine, and 7 parts of copper powder is heated in a jacketed vessel at 140 to 150° C. (jacket temperature) and an absolute pressure of 40 mm. of mercury for 6 hours. The mixture, which refluxes gently during the first hour, gradually becomes more viscous and ceases reflux as the reaction progresses. An excess of 10% aqueous muriatic acid is added, whereupon the copper is filtered out and the reactants then made alkaline with an excess of 25% aqueous caustic soda. The base, thus precipitated as an oil, is induced to crystallize on cooling. The product is filtered out, ground and washed with water, and finally dried to give a tan solid melting at 97–98° C. Recrystallization from 5 volumes of methyl alcohol yields buff-colored crystals, M. P. 101–102° C.

B. *2-(N-diethylaminoethyl-p-phenetidino)-4-methylpyridine.*—To a stirred suspension of 29 parts of sodamide in 2150 parts of dry toluene at 90–100° C. under an atmosphere of nitrogen is added 170 parts of 4-methyl-2-(p-phenetidino)pyridine. The reactants are refluxed and stirred for approximately 3 hours, at the end of which time heating is discontinued and 100 parts of diethylaminoethyl chloride is slowly added. An exothermic reaction ensues, following which heat is again applied and reflux continued for 15 hours. Approximately 2500 parts of water is then added, whereupon the toluene layer is, successively, separated, washed with water, and subjected to vacuum distillation to remove the solvent. The dark, viscous oil which remains is the desired product. It may be converted to the hydrochloric acid salt by dissolving in 2000 parts of anhydrous ether and treating with two molecular equivalents of absolute alcoholic hydrogen chloride solution. The salt is isolated by decanting the supernatant ether-alcohol layer, taking up the residue in 1750 parts of boiling butanone, then allowing to cool and stand at 25° C. The dihydrochloride comes out as nearly colorless crystals which, recovered on a funnel and dried at 75° C., melt at 201–203° C.

C. *2-(N-diethylaminoethyl-p-phenetidino)-4-methylpyridine methobromide.*—A solution of 130 parts of 2-(N-diethylaminoethyl-p-phenetidino)-4-methylpyridine and 38 parts of methyl bromide in 750 parts of dry chloroform is allowed to react in a closed system for 24 hours at 25° C. The solvent is then distilled off, leaving a viscous residue which is taken up in 2100 parts of anhydrous ether. The crystalline quaternary compound forms on standing. It is filtered off, rinsed with ether, and finally dried at 75° C. to a brown powder. The powder is dissolved in 1600 parts of butanone and the solution then treated with decolorizing charcoal, following which it is evaporated to approximately ⅓ its original volume. Upon refrigeration and storage, there is deposited nearly colorless crystals of 2-(N-diethylaminoethyl-p-phenetidino)-4-methylpyridine methobromide which, filtered off, washed with fresh solvent, and dried, melts at 137° C. The product is readily soluble in water. It has the formula

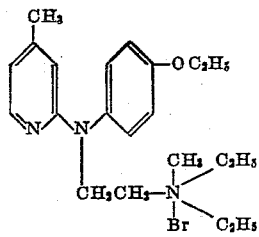

*Example 2*

A. *6-methyl-2-(p-phenetidino)-pyridine.*—A mixture of 516 parts of 2-bromo-6-methylpyridine, 411 parts of p-phenetidine, and 10 parts of copper powder is heated in a jacketed vessel at 140–150° C. (jacket temperature) and an absolute pressure of 40 mm. of mercury for 6 hours according to the technique of Example 1A. The reaction mixture is then acidified with approximately 10,000 parts of 10% aqueous muriatic acid, filtered, and make alkaline with an excess of 25% aqueous caustic soda, in that order. The base so precipitated granulates on standing, and is thereupon filtered out and, successively, ground and washed with water, dried, and finally recrystallized from 6 volumes of cyclohexane to give tan needles, M. P. 91–92° C.

B. *2-(N-diethylaminoethyl-p-phenetidino)-6-methylpyridine.*—Using essentially the procedure of Example 1B, 229 parts of 6-methyl-2-(p-phenetidino)pyridine, 39 parts of sodamide, and 135 parts of diethylaminoethyl chloride in 2600 parts of toluene are reacted at reflux temperatures for 20 hours to give, in good yield, the desired 2 - (N - diethylaminoethyl - p - phenetidino) - 6 - methylpyridine as an oil. The base may be converted to the dihydrochloride by reaction in anhydrous ether solution with two molecular equivalents of absolute alcoholic hydrogen chloride solution. The salt comes down as a viscous oil which granulates on standing. Recrystallization from 10 volumes of a mixture consisting of 11 parts of isopropyl alcohol and 50 parts of ethyl acetate gives, on treatment with decolorizing charcoal, colorless crystals, M. P. 154° C.

C. *2 - (N - diethylaminoethyl-p-phenetidino)-6-methylpyridine methobromide.*—A solution of 135 parts of 2-(N - diethylaminoethyl - p-phenetidino)-6-methylpyridine and 39 parts of methyl bromide in 1100 parts of chloroform is stored in a closed container for 24 hours at 25° C., at the end of which time the bulk of the solvent is removed by vacuum distillation and 2100 parts of anhydrous ether is then added to the viscous residue. The product, which becomes crystalline on standing, is recrystallized from 1000 parts of butanone to give white crystals of 2-(N-diethylaminoethyl-p-phenetidino)-6-methylpyridine methobromide, M. P. 136–137° C. It has the formula

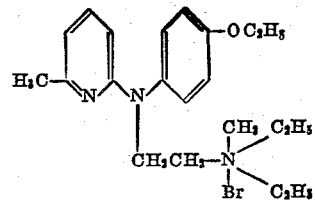

*Example 3*

A. *6-methyl-2-(m-phenetidino)pyridine.*—A mixture of 344 parts of 2-bromo-6-methylpyridine, 274 parts of m-phenetidine, and 10 parts of copper powder is heated at 140–150° C. (jacket temperature) under an absolute pressure of 40 mm. of mercury for 6 hours in accordance with the procedure of Example 1A. Successive acidification, filtration, alkalization, and extraction with ether, followed by stripping of the solvent and distillation in vacuo, yields the desired base as a yellow oil, B. P. 145–147° C. at 0.3 mm. pressure. The monohydrochloride may be prepared from the base by treatment of an anhydrous ether solution thereof with one molecular equivalent of absolute alcoholic hydrochloric acid. The product, which melts at 114–115° C., is readily soluble in water.

B. *2 - (N-diethylaminoethyl-m-phenetidino)-6-methylpyridine.*—Interaction of 228 parts of 6-methyl-2-m-phenetidinopyridine, 39 parts of sodamide, and 135 parts of diethylaminoethyl chloride, using 2600 parts of toluene as the solvent and following the procedure described in Example 1B, affords a good yield of 2-(N-diethylaminoethyl-m-phenetidino)-6-methylpyridine which, treated in anhydrous ether solution with two molecular equivalents of absolute alcoholic hydrogen chloride solution, gives the dihydrochloride as a brown solid. The latter may be further purified by crystallization from 13 volumes of a mixture consisting of 8 parts of isopropyl alcohol and 36 parts of ethyl acetate, yielding colorless crystals, M. P. 169–170° C.

C. *2 - (N-diethylaminoethyl-m-phenetidino)-6-methylpyridine methobromide.*—The tertiary base of the preceding Example 3B is quaternized as described in Example 1C by reacting 163 parts thereof together with 48 parts of methyl bromide in 750 parts of chloroform for 24 hours at 25° C. Removal of solvent and addition of ether gives a viscous oil which granulates on standing. Crystallization from 10 volumes of butanone, using decolorizing charcoal in process, affords colorless crystals, M. P. 139° C. The product has the formula

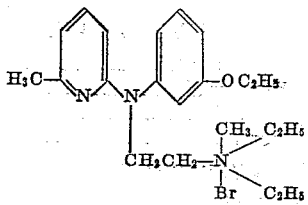

*Example 4*

A. *2 - (m-phenetidino)pyridine.*—A mixture of 158 parts of 2-bromopyridine, 137 parts of m-phenetidine, and 6 parts of copper powder is heated in a jacketed container at 140–150° C. (jacket temperature) and an absolute pressure of 60 mm. of mercury for 3 hours, at the end of which time sufficient 10% aqueous muriatic acid is introduced to render the reaction mixture acid, whereupon the copper catalyst is filtered out. The filtrate is made alkaline with 25% aqueous caustic soda; and the base, which is precipitated as an oil, is then extracted into ether. Stripping of the solvent, followed by vacuum distillation, yields the desired 2-(m-phenetidino)-pyridine, B. P. 148–151° C. at 0.7 mm. pressure. The monohydrochloride may be prepared from the base by treatment of an anhydrous ether solution thereof with one molecular equivalent of absolute alcoholic hydrochloric acid. The product is readily soluble in water.

B. *2 - (N-β-di-n-butylaminopropyl-m-phenetidino)pyridine.*—To a stirred suspension of 39 parts of sodamide in 3500 parts of benzene at reflux temperature under a nitrogen atmosphere is added 214 parts of 2-(m-phenetidino)-pyridine. The reaction mixture is maintained at reflux temperature, with stirring, until evolution of ammonia gas ceases—which is usually after about 5 hours. At this point, heating is temporarily discontinued while 250 parts of β-di-n-butylaminopropyl bromide is slowly added, following which heat is again applied and reflux continued with stirring for 24 hours. Approximately 4000 parts of water is then added, whereupon the benzene layer is, successively, separated, washed with water, and subjected to vacuum distillation to remove the solvent. The residual dark, viscous oil is the desired product. It may be converted to the hydrochloric acid salt by dissolution in 3000 parts of anhydrous ether and subsequent reaction with two molecular equivalents of absolute alcoholic hydrogen chloride solution according to the technique of Example 1B.

C. *2 - (N-β-di-n-butylaminopropyl-m-phenetidino)pyridine ethyl sulfate.*—A mixture consisting of 126 parts of the base of Example 4B, 50 parts of diethyl sulfate, and 500 parts of anhydrous butanol is maintained at 50° C., with stirring, for 30 hours. The quaternary ammonium compound so prepared has the formula

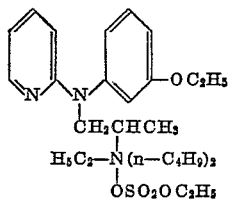

*Example 5*

A. *2-(p-phenetidino)pyridine.*—A mixture of 158 parts of 2-bromopyridine, 137 parts of p-phenetidine, and 6 parts of copper powder is heated at 140–150° C. (jacket temperature) under an absolute pressure of 40 mm. of mercury for 6 hours. The reaction mixture is worked up as described in Example 4A, successive acidification, filtration, alkalization, and extraction with ether, followed by stripping of the solvent and distillation in vacuo, yielding the desired base as nearly white crystals, M. P. 92° C.

B. *2-(N - diethylaminoethyl-p-phenetidino)-pyridine.*—By reaction of 214 parts of the base of the preceding Example 5A, 39 parts of sodamide, and 135 parts of diethylaminoethyl chloride, using 2600 parts of toluene as the solvent and following the procedure of Example 1B, a good yield of 2-(N-diethylaminoethyl-p-phenetidino)-pyridine is obtained as an oil. Conversion to the dihydrochloride may be accomplished in conventional fashion by treatment with two molecular equivalents of absolute alcoholic hydrogen chloride solution. The dihydrochloride may be crystallized from 10 volumes of a mixture consisting of 47 parts of isopropyl alcohol and 216 parts of ethyl acetate. It melts at 158–159° C.

C. *2-(N - diethylaminoethyl - p - phenetidino)-pyridine methobromide.*—The tertiary base of Example 5B is quaternized as described in Example 1C by interaction of 142 parts thereof with 35 parts of methyl bromide in 650 parts of chloroform for 24 hours at 25° C. Crystallization from 14 volumes of a mixture consisting of 30 parts of isopropyl alcohol and 145 parts of ethyl acetate gives snow-white crystals, M. P. 159–160° C. The product is readily soluble in water. It has the formula

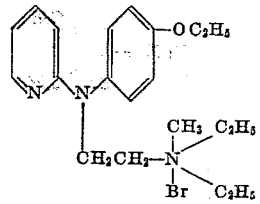

I claim:
1. A compound of the formula

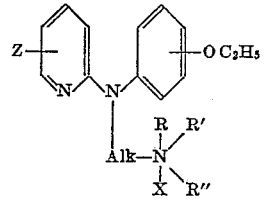

wherein Alk is a lower alkylene radical containing at least 2 and not more than 4 carbon atoms; Z is a member of the group consisting of hydrogen and a methyl radical; R is a lower alkyl radical; NR'R'' is a member of the group consisting of lower dialkylamino, pyrrolidino, morpholino and piperidino radicals; and X is one equivalent of a non-toxic anion.

2. An N-dialkylaminoethylphenetidinopicoline alkyl halide quaternary salt of the formula

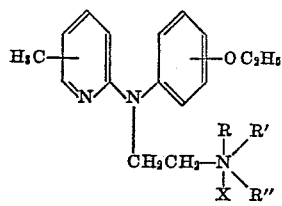

wherein R, R', and R'' are lower alkyl groups and X is halogen.

3. An N-diethylaminoethylphenetidinopicoline methobromide of the formula

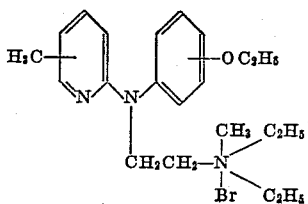

4. 2-(N-diethylaminoethyl-p-phenetidino)-4-methylpyridine methobromide.

5. 2-(N-diethylaminoethyl-p-phenetidino)-6-methylpyridine methobromide.

6. 2-(N-diethylaminoethyl-m-phenetidino)-6-methylpyridine methobromide.

7. An N-dialkylaminoethylphenetidinopyridine alkyl halide quaternary salt of the formula

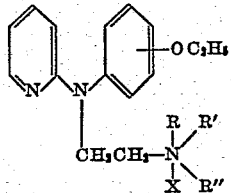

wherein R, R', and R" are lower alkyl groups and X is halogen.

8. An N-diethylaminoethylphenetidinopyridine methobromide of the formula

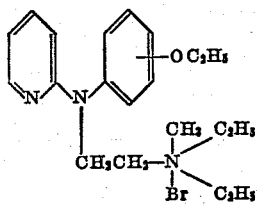

9. 2-(N-β-di-n-butylaminopropyl-m-phenetidino)-pyridine ethyl sulfate.

10. 2-(N-diethylaminoethyl-p-phenetidino)-pyridine methobromide.

References Cited in the file of this patent

UNITED STATES PATENTS

| | | |
|---|---|---|
| 2,406,594 | Djerassi et al. | Aug. 27, 1946 |
| 2,479,843 | Knox et al. | Aug. 23, 1949 |
| 2,502,151 | Horclois | Mar. 28, 1950 |
| 2,623,880 | Hopff et al. | Dec. 30, 1952 |

OTHER REFERENCES

Idson: Chem. Reviews, vol. 47 (December 1950) pp. 341–44, 377, 379, 462–66, 470–73, 477–79 and 505–08.